United States Patent [19]
Godbee et al.

[11] 3,920,577

[45] Nov. 18, 1975

[54] IODINE RETENTION DURING EVAPORATIVE VOLUME REDUCTION

[75] Inventors: Herschel W. Godbee, Oak Ridge; George I. Cathers, Knoxville; Raymond E. Blanco, Oak Ridge, all of Tenn.

[73] Assignee: The United States of America as represented by the United States Energy Research and Development Administration, Washington, D.C.

[22] Filed: July 16, 1974

[21] Appl. No.: 489,791

[52] U.S. Cl. ................. 252/301.1 W; 252/301.1 R
[51] Int. Cl.² ........................................ C09K 11/04
[58] Field of Search ............. 252/301.1 W, 301.1 R

[56] References Cited
UNITED STATES PATENTS 3,792,154   2/1974   Cathers ...................... 252/301.1 R

OTHER PUBLICATIONS

Nuclear Science Abstracts, 1973, 28 (11), 27131.

*Primary Examiner*—Benjamin R. Padgett
*Assistant Examiner*—Deborah L. Kyle
*Attorney, Agent, or Firm*—Dean E. Carlson; David S. Zachry; John B. Hardaway

[57] ABSTRACT

An improved method for retaining radioactive iodine in aqueous waste solutions during volume reduction is disclosed. The method applies to evaporative volume reduction processes whereby the decontaminated (evaporated) water can be returned safely to the environment. The method generally comprises isotopically diluting the waste solution with a nonradioactive iodide and maintaining the solution at a high pH during evaporation.

4 Claims, 8 Drawing Figures

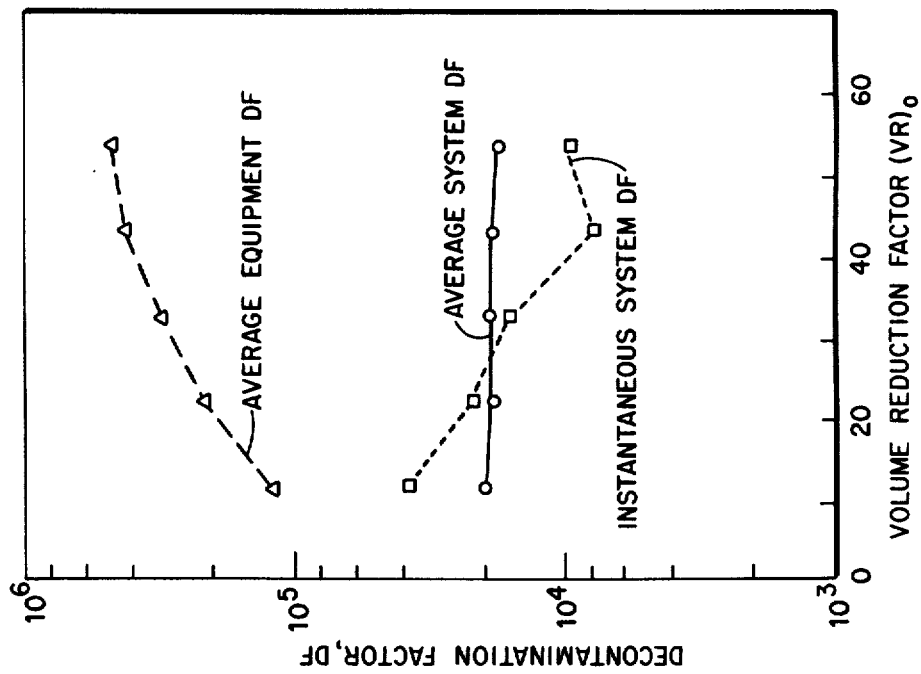
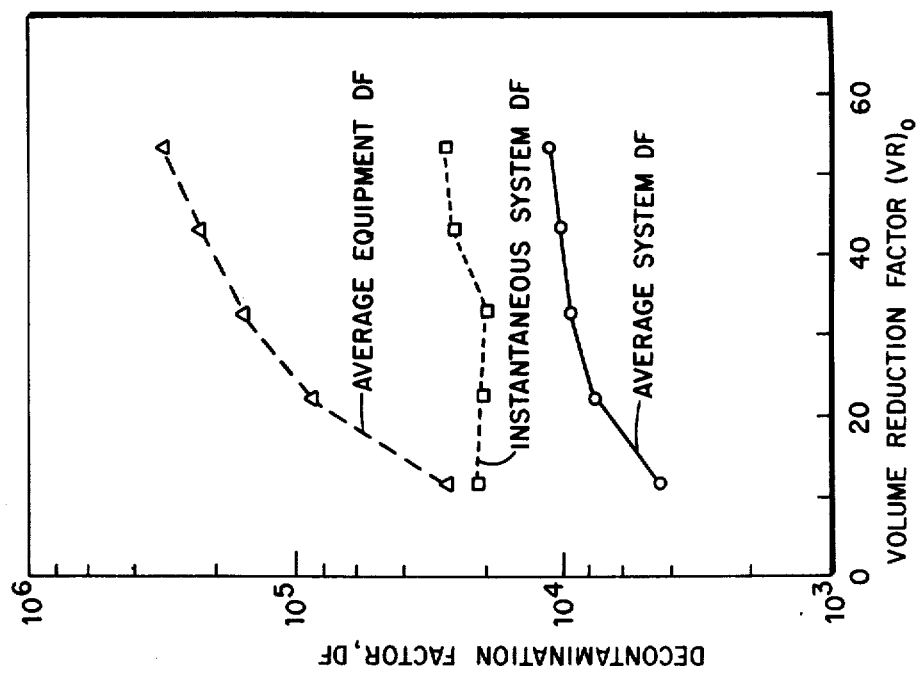

IODINE RETENTION DURING EVAPORATIVE VOLUME REDUCTION

BACKGROUND OF THE INVENTION

This invention was made in the course of, or under, a contract with the U.S. Atomic Energy Commission. It relates generally to the art of decontamination.

Relatively large volumes of radioactively contaminated liquid wastes are generated at nuclear installations. These waste solutions may contain low concentrations of sodium, potassium, aluminum, iron, borate, carbonate, nitrate, sulfate, and/or hydroxide, and other chemicals. The volume of such aqueous wastes can be reduced by evaporation. However, whether the vaporized portion is released to the atmosphere or condensed and discharged to the environment as water, it is necessary for radionuclides to be retained within the liquid or solid phase of an evaporator. Several undesirable radionuclides commonly occur in volatile form in these wastes, such as ruthenium and iodine. The element of principal interest is iodine, which exists in oxidation states between $-1$ and $+7$, including some volatile inorganic and organic forms.

Prior to the invention herein disclosed, various methods have been attempted for retaining iodine within an evaporator during volume reduction. Such methods have included pH control and the use of differing reductant additives. However, such prior art methods have only been partially successful.

SUMMARY OF THE INVENTION

It is thus an object of this invention to provide a method for preventing volatilization of radioiodine values during evaporative concentration of nuclear installation aqueous wastes.

This object as well as other objects is accomplished by the present invention. The process of this invention generally comprises the following steps:

1. adding nonradioiodine to a waste solution in the form of a soluble inorganic iodide, to provide a quantity of nonradioiodine sufficient to chemically dominate the trace quantities of radioiodine;
2. adjusting and maintaining the pH of the solution to not less than pH 9, to favor reduction of iodine values to low oxidation states;
3. adding to the solution a soluble reducing agent such as an alkali sulfite, to cause iodine values to be maintained in a nonvolatile, inorganic iodide form; and
4. evaporating the solution at temperatures up to the ambient pressure boiling point of that solution.

BRIEF DESCRIPTION OF THE DRAWINGS

FIGS. 2–8 are graphical representations of decontamination factors achieved utilizing various processes.

DETAILED DESCRIPTION

Figure 1:
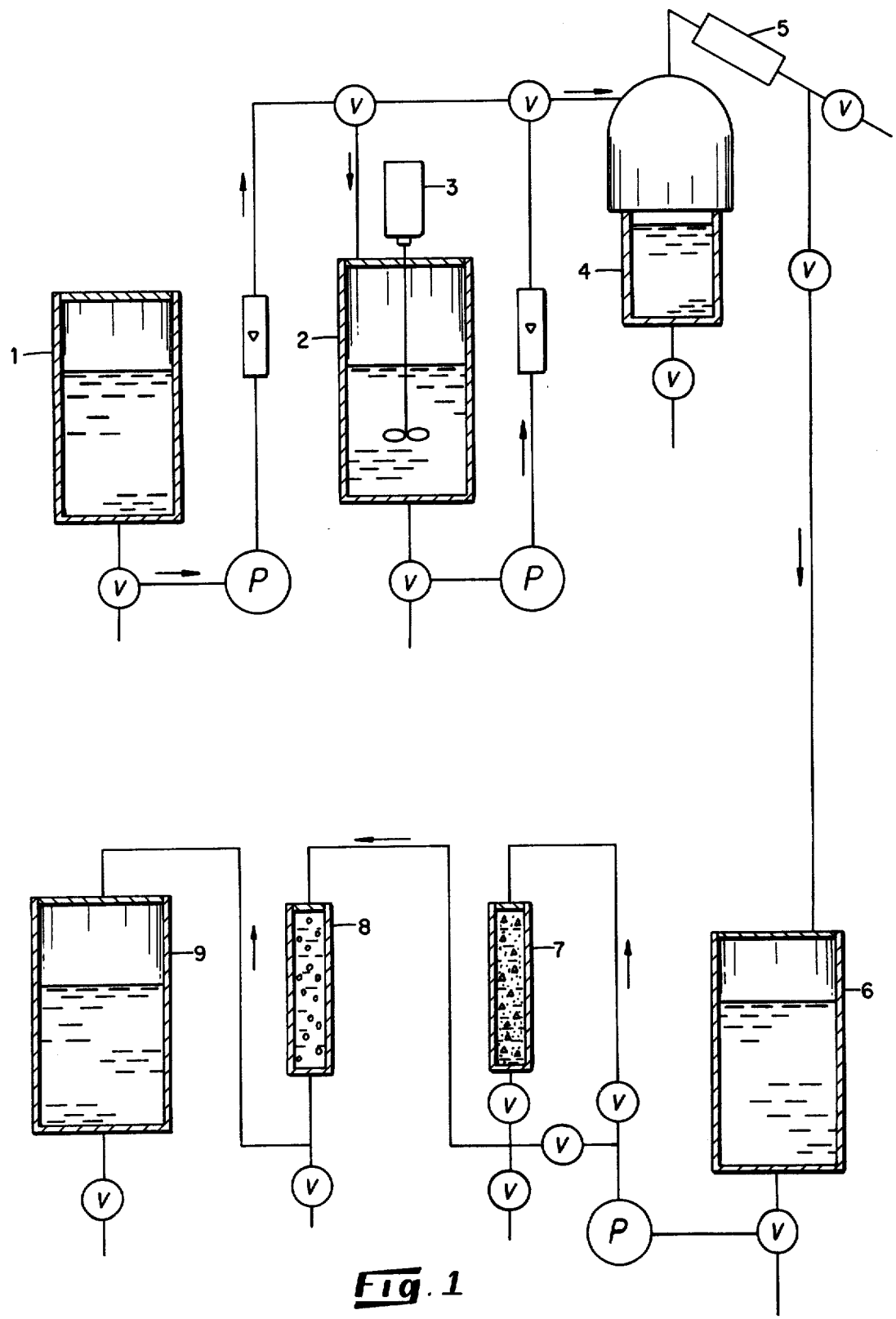
FIG. 1 is a schematic diagram of an apparatus used in the process of this invention.

According to this invention it has been found that aqueous waste solutions from nuclear installations may be effectively concentrated for eventual storage of the radioactive contaminants, while being able to release about 90 to 99 volume percent of the waste solution back to the environment.

The first step in the process of this invention is to isotopically dilute the waste solution with nonradioactive iodine. The amount of nonradioactive iodine diluent added to the solution is at least $10^3$ and preferably about $10^6$ times the amount of radioactive iodine in solution. By isotopic dilution and the phenomenon of isotopic exchange, every chemical species of iodine within the solution should be composed of radioactive iodine and nonradioactive iodine in the same ratio as that of the active to the diluent isotopes in solution. The amount of volatile iodine species containing radioactive iodine is thus proportionately decreased because of the increase in the amount of those species containing nonradioactive iodine.

After isotopic dilution, the pH of the solution is raised to at least 9. Most of the volatile forms of iodine are in the higher oxidation states, e.g., $+5$ or $+7$. By maintaining the high pH, reduction of the iodine in the higher oxidation states to the iodide state is favored. The pH of the solution is adjusted by the addition of alkali or alkaline earth hydroxides, with sodium hydroxide being preferred.

As a further measure to insure that the iodine is reduced to the iodide state and to prevent the iodides from converting to free iodine, a reducing agent is added to the solution. Alkali sulfites or thiosulfates may be used as reducing agents in this step. Sodium sulfite and sodium thiosulfate are excellent reducing agents for use in this invention with sodium sulfite in particular being preferred. The amount of reducing agent used in this step is an amount theoretically sufficient to reduce all zero and positive valence iodine species to the iodide state. This amount will, of course, vary depending on the particular type of waste and the amount of iodine present.

Having carried out the above steps, the thus treated waste solution is boiled to evaporate the aqueous phase and concentrate the radioactive as well as other contaminants.

It has been found that the combination of steps according to this invention synergistically improves the iodine retention within an evaporator. If none of the above steps are taken, a decontamination factor of only about 50 to 100 is obtained. If only isotopic dilution is utilized a decontamination factor of about $5 \times 10^2$ is obtained. A similar decontamination factor is obtained utilizing isotopic dilution and pH control. However, when all three steps are carried out prior to evaporation, a decontamination factor of $10^3$ to $10^4$ is achieved.

Having generally described the process of this invention, the following example is given as a further illustration thereof.

EXAMPLE

The invention was illustrated during a series of experiments performed wherein simulated intermediate-level radioactive waste solutions were evaporated to reduce the original volume. The composition of the simulated waste solutions used in the experiments is indicated in the table.

Table

Composition and Properties of Simulated Liquid Radwastes

| Constituents | Concentration (g-mole/liter) | |
| --- | --- | --- |
| | Intermediate Level Waste | Borate Waste |
| $Na^+$ | 0.55 | 0.128 |
| $Cs^+$ | 0.0082 | |
| $NH_4^+$ | 0.001 | |
| $H^+$ | | 0.0693 |
| $Ca^{2+}$ | 0.0017 | |
| $Sr^{2+}$ | 0.0023 | |

Table-continued

Composition and Properties of Simulated Liquid Radwastes

| Constituents | Concentration (g-mole/liter) | |
| --- | --- | --- |
| | Intermediate Level Waste | Borate Waste |
| $Al^{3+}$ | 0.0025 | |
| $Cl^-$ | 0.031 | |
| $OH^-$ | 0.06 | |
| $NO_3^-$ | 0.295 | |
| $CO_3^{2-}$ | 0.0633 | |
| $SO_4^{2-}$ | 0.313 | |
| $BO_3^{3-}$ | | 0.0231 |
| Property | | |
| pH | 10.9 | 12.8 |
| Electrical conductivity | $6.9 \times 10^{-3}$ mho/cm | $22 \times 10^{-3}$ mho/cm |

A schematic diagram of the apparatus used is shown in FIG. 1. The apparatus comprised a feed tank, a mixing tank with mixer 3, an evaporator 4, a condenser 5, condensate tank 6, adsorber column 7, an ion exchange column 8, and a product tank 9. The adsorber and ion exchange columns were not used in this example.

The effectiveness of unit operations such as demineralization (ion exchange), filtration, centrifugation, and evaporation for reducing the radioactivity in effluent streams from nuclear installations is herein (and is usually) expressed in terms of the decontamination factor (DF) for each isotope of concern and gross activity. The instantaneous decontamination factor across the evaporator system, $(DF)_{si}$, often called the process DF, is defined as the ratio of the feed concentration at any time to the condensate concentration at that time. The average system DF, $(\overline{DF})_s$, is the ratio of the feed concentration to the average condensate concentration.

Figure 3:
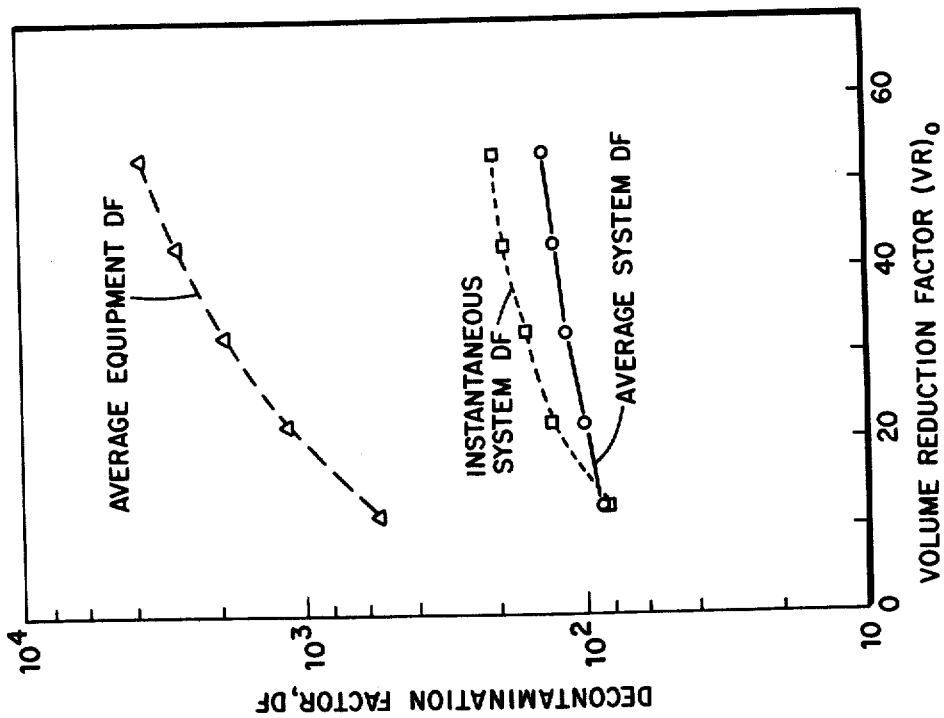
Figure 2:
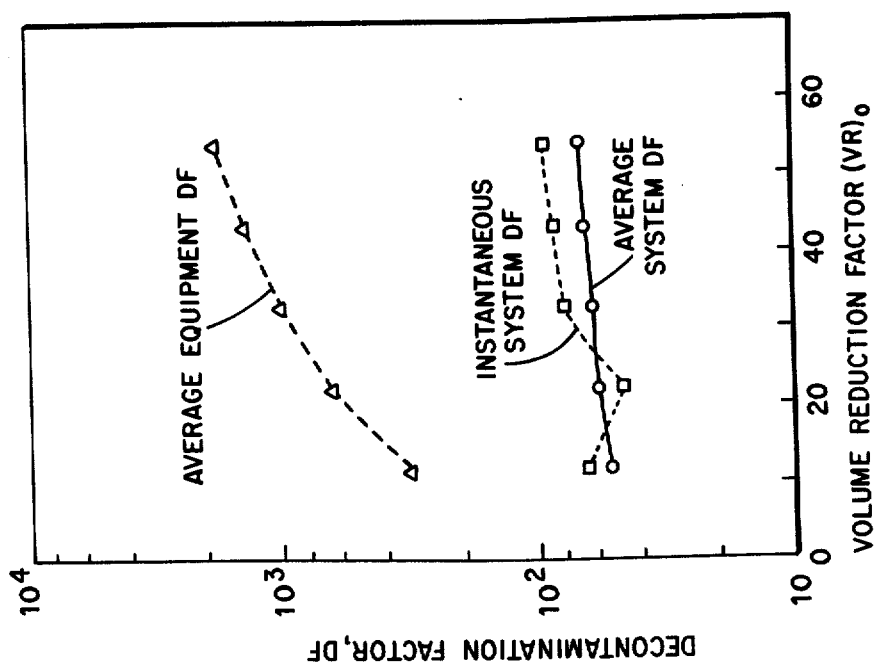

The compositions listed in the above table were reduced in volume by boiling without the benefit of isotopic dilution or reducing agents. As is noted in the table, the pH of the solutions was initially in excess of 9. The DF's of this volume reduction are recorded in FIGS. 2 and 3. A possible explanation of the low DF's for iodine is the very low concentration of iodine compared to the concentration of low-molecular-weight organics in the solutions (viz., organics in the tap water used to prepare solutions, sorbed from the air, and leached from plastic containers used in preparing and for storing the solutions). In other words, the ratio of the concentration of trace organics to the concentration of tracer iodine (the only iodine added to the above two experiments) is high and the probability of forming organic iodides with most or all of the tracer is high. To reduce the amount of radioactive iodine in organic iodides, an iodide salt containing only nonradioactive iodine was added to the wastes—a technique frequently called isotopic dilution. After the addition of 0.2 $\mu$Ci/ml of $^{131}$I and 0.01 g-mole/liter of nonradioactive potassium iodide to the wastes as shown in the table, the average system DF for iodine increased to mid $10^3$–$10^4$ for the intermediate level wastes (cf. FIG. 2 to FIG. 4) and increased to low $10^4$ with the borate waste (cf. FIG. 3 to FIG. 5).

Figure 7:
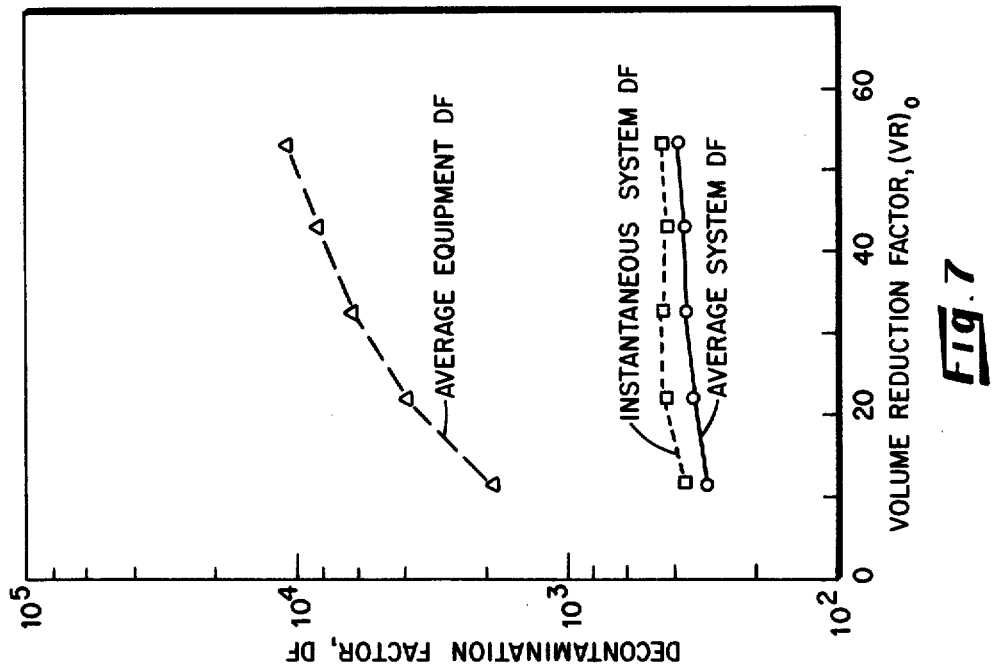
Figure 6:
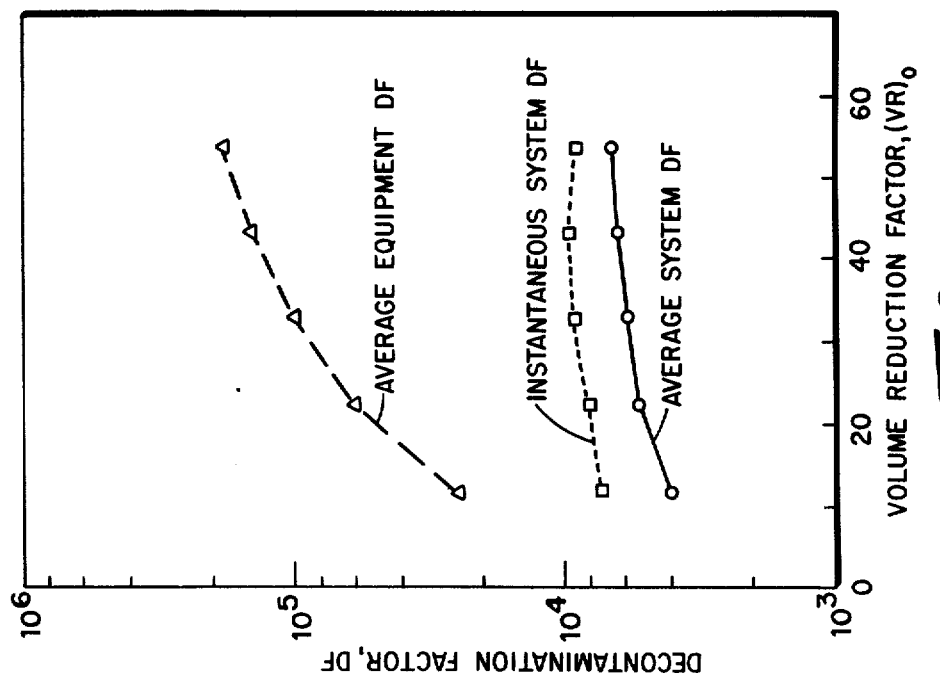

To determine the effect on the above iodine DF's of a large amount of an organic known to form iodides readily, 0.5 g/liter of diethylbenzene was added to the borate waste in addition to the 0.2 $\mu$Ci/ml of $^{131}$I and 0.01 g-mole/liter of KI. The average system DF's obtained in these experiments (FIG. 6) were about half those without the diethylbenzene, i.e., in the range of low to mid $10^3$. An increase in the amount of KI to 0.02 g-mole/liter of borate waste, while maintaining the $(C_2H_5)_2C_6H_4$ at 0.5 g/liter and the tracer iodine at 0.2 $\mu$Ci/ml, lowered the average system DF's to about mid $10^2$ (FIG. 7).

Figure 8:
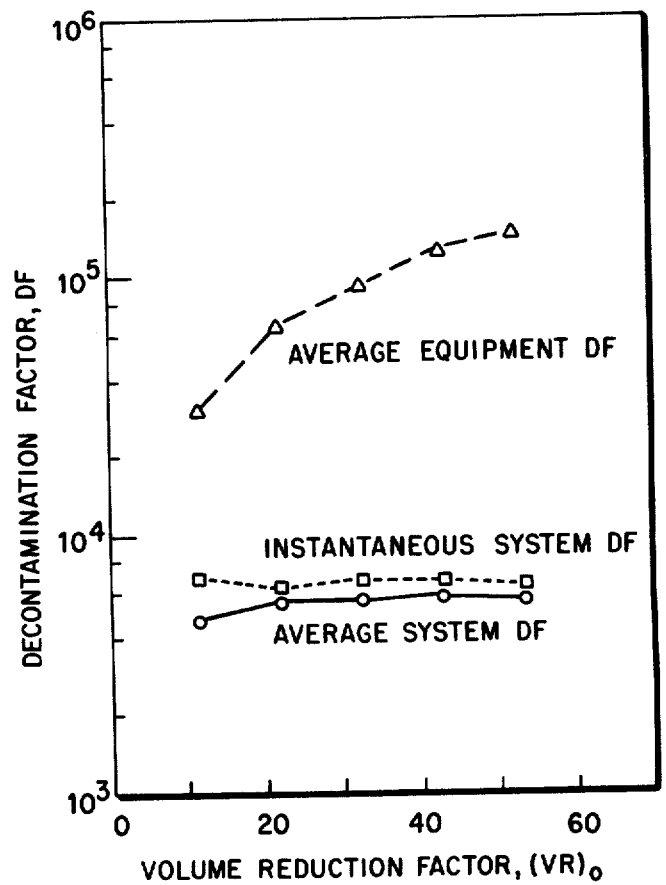

A possible explanation of the latter result with KI addition is that the concentration of iodide in the aqueous phase was increased beyond a value at which it could all be maintained in the nonvolatile iodide state. That is to say, elemental iodine was probably volatilized from the waste. To test this supposition, sodium sulfite was selected as a reductant to adjust the iodide solubility of the waste. To the borate waste containing 0.2 $\mu$Ci/ml of $^{131}$I, 0.5 g/liter of $(C_2H_5)_2C_6H_4$, and 0.02 g-mole/liter of KI, was added 0.1 g-mole-liter of $Na_2SO_3$. The average system DF's of mid $10^2$ obtained without sulfite addition increased to mid $10^3$ with sulfite addition (cf. FIGS. 7 and 8).

What is claimed is:

1. A method for retaining radioactive iodine within an aqueous waste solution during evaporative volume reduction, comprising the steps of:
   isotopically diluting said waste solution with nonradioactive iodine wherein the amount of nonradioactive iodine diluent added to said solution is at least $10^3$ times the amount of radioactive iodine present in said solution;
   adjusting the pH of said solution to at least pH 9;
   adding an effective amount of a reducing agent to reduce iodine species in 0 to +7 oxidation states to the iodide state; and
   evaporating the aqueous phase of said solution while substantially retaining radioactive iodine within said solution.

2. The method according to claim 1 wherein said pH is adjusted by addition of sodium hydroxide.

3. The method according to claim 1 wherein said reducing agent is an alkali sulfite or an alkali thiosulfate.

4. The method according to claim 3 wherein said reducing agent is sodium sulfite.

* * * * *